(12) United States Patent
Asai et al.

(10) Patent No.: US 8,326,530 B2
(45) Date of Patent: Dec. 4, 2012

(54) SYSTEM AND APPARATUS FOR PROCESSING INFORMATION, IMAGE DISPLAY APPARATUS, CONTROL METHOD AND COMPUTER PROGRAM

(75) Inventors: Atsushi Asai, Kanagawa (JP); Junpei Ito, Tokyo (JP)

(73) Assignee: Sony Corporationj, Tokyo (JP)

( * ) Notice: Subject to any disclaimer, the term of this patent is extended or adjusted under 35 U.S.C. 154(b) by 1196 days.

(21) Appl. No.: 12/016,789

(22) Filed: Jan. 18, 2008

(65) Prior Publication Data

US 2008/0183383 A1     Jul. 31, 2008

(30) Foreign Application Priority Data

Jan. 31, 2007   (JP) ................ P2007-022329

(51) Int. Cl.
*G01C 21/00*   (2006.01)
*G06T 17/00*   (2006.01)
(52) U.S. Cl. .......... 701/438; 701/436; 345/420
(58) Field of Classification Search .......... None
See application file for complete search history.

(56) References Cited

U.S. PATENT DOCUMENTS

| 7,804,498 B1* | 9/2010 | Graham et al. ........... 345/419 |
| 2005/0234638 A1* | 10/2005 | Ogaki et al. ........... 701/209 |
| 2006/0087507 A1 | 4/2006 | Urano et al. |

FOREIGN PATENT DOCUMENTS

JP   2006-120057   5/2006

\* cited by examiner

*Primary Examiner* — Ryan Zeender
*Assistant Examiner* — H Rojas
(74) *Attorney, Agent, or Firm* — Finnegan, Henderson, Farabow, Garrett & Dunner, L.L.P.

(57) ABSTRACT

An information processing apparatus includes a three-dimensional map data storage unit for storing three-dimensional map data for use in projecting a three-dimensional space on a map onto a plane, a location information storage unit for storing location information including a type of geographical objects at points spaced at predetermined intervals on the map represented by the three-dimensional map data with the location information in association with the respective point, a geographical object information storage unit for storing geographical object information, the geographical object information including a position of a geographical object on the map and display information relating to the geographic object, and a placement position setting unit for setting a display information placement position indicating a position of a sign pointing to the display information on the map based on the location information present within a predetermined area of the position of the geographical object indicated by the display information.

12 Claims, 11 Drawing Sheets

SYSTEM AND APPARATUS FOR PROCESSING INFORMATION, IMAGE DISPLAY APPARATUS, CONTROL METHOD AND COMPUTER PROGRAM

CROSS REFERENCES TO RELATED APPLICATIONS

The present invention contains subject matter related to Japanese Patent Application JP 2007-022329 filed in the Japanese Patent Office on Jan. 31, 2007, the entire contents of which are incorporated herein by reference.

BACKGROUND OF THE INVENTION

1. Field of the Invention

The present invention relates to an information processing apparatus and, in particular, to an information processing apparatus, an image display apparatus, an information processing system, a control method and a computer program for storing map data.

2. Description of the Related Art

Information processing apparatuses for projecting a streetscape constructed using three-dimensional graphics onto a plane and displaying the streetscape three-dimensionally on a display are available. Some information processing apparatuses allow users to walk freely through streets in a virtual fashion in response to a user operation.

Japanese Unexamined Patent Application Publication No. 2006-120057 discloses an information processing apparatus that generates a three-dimensional image by projecting a three-dimensional space onto a plane and displays the generated three-dimensional image.

SUMMARY OF THE INVENTION

In accordance with the related art, in response to a user operation, a user can walk along a road in streets constructed using three-dimensional graphics.

The user now walks around in the street constructed using the three-dimensional graphics. Unlike driving through, the user can slowly walk through between buildings on both side of a street in a three-dimensional image. For example, an icon posting information about a store in a building along the road is placed three-dimensionally as a sign near the building. In this way, the user is provided with a variety of information relating to the place in which the user is walking around.

The icon posting the information of the store is displayed close to the building containing the store. In this case, the icon is overlaid on the streetscape constructed using the three-dimensional graphics. If the icon is superimposed on the image of building contained in the streetscape, part of the icon may be hidden under the image of the building. If images of a plurality of buildings contained in the streetscape are displayed in an overlay manner, the icon can be overlaid on one building while overlaying another building. The icon overlaying the one building can be drawn on only the other building. The relationship of the buildings and the icon can be confusing to the user.

If the user walks through a place where many buildings are present, the icon can be hidden under buildings or the perspective relationship of the icon and the buildings becomes confusing. Appropriate information cannot be provided to the user.

The user may manually determine an appropriate placement position of the icon in the three-dimensional space on the map while checking the buildings on the map. It is practically difficult for the user to perform such an operation over a large area of the map.

In the map walk-through, the user may detect successively the layout of the buildings on the map corresponding to the three-dimensional image displayed on a display and determine the appropriate placement position of the icon in the three-dimensional space on the map.

To perform such a placement position determination process, space figures in the three-dimensional space needs to be calculated. Workload involved becomes large. If such an application program for the determination process is performed in a personal computer or a built-in device, each having typically limited performance specifications, process speed is substantially reduced. A reduced process speed leads to slow walk-through speed, and a comfortable walk-through cannot be enjoyed.

It is thus desirable to set appropriately the placement position of display information relating to a geographical object on a map corresponding to a three-dimensional image.

In accordance with one embodiment of the present invention, an information processing apparatus, includes a three-dimensional map data storage unit for storing three-dimensional map data for use in projecting a three-dimensional space on a map onto a plane, a location information storage unit for storing location information including a type of geographical objects at points spaced at predetermined intervals on the map represented by the three-dimensional map data with the location information in association with the respective point, a geographical object information storage unit for storing geographical object information, the geographical object information including a position of a geographical object on the map and display information relating to the geographic object, and a placement position setting unit for setting a display information placement position indicating a position of a sign pointing to the display information on the map based on the location information present within a predetermined area of the position of the geographical object indicated by the display information. The placement position of the sign indicating the display information related to the geographical object on the map is set based on the location information present within the predetermined area of the position of the geographical object corresponding to the display information.

Preferably, the information of the type of the geographical object includes a type difference differentiating between road and building. The position of the geographical object contained in the geographic object information is now set as a base point and location information of the road type out of location information present within a predetermined area centered on the base point is set as reference location information. The placement position setting unit sets a position identified by the reference location information as the display information placement position of the geographical object at the base point if all location information present within a predetermined area centered on the reference location information indicates the road type and if no location information is present for a building other than the geographical object between the reference location information and the base point. Location information of the road type out of location information present within a search range along the circumference of a circle having a predetermined radius centered on the base point is the reference location information. The placement position setting unit sets a position identified by the reference location information as the display information placement position of the geographical object at the base point if all location information present within a circle having a predetermined radius centered on the reference location information indicates the road type and if no location information is present for a building other than the geographical object between the reference location information and the base point. If all location information present within the circle having the predetermined radius centered on the reference location information indicates the road type and if no location information is present for the building other than the geographical object between the reference location information and the base point, the position corresponding to the reference location information is set as the display information placement position.

Preferably, the location information includes altitude data at the points at the predetermined intervals on the map, and the placement position setting unit sets an altitude of the sign to be placed at the display information placement position based on the altitude data contained in the location information for the set display information placement position. The altitude of the sign to be placed at the display information placement position is thus set based on the altitude data contained in the location information at the display information placement position.

The location information may include information at each of points of a grid arranged on the map. The display information placement position is determined using the location information at each point of the grid arranged on the map.

The information processing apparatus may further include a drawing unit for drawing a three-dimensional image produced by projecting the three-dimensional space on the map corresponding to the three-dimensional map data onto a plane and drawing the sign at the set display information placement position. The three-dimensional image for projecting the three-dimensional space on the map is drawn and the sign is also drawn at the set display information placement position. The drawing unit may draw an image indicating the geographical object contained in the three-dimensional image and the sign corresponding to the geographical object so that a predetermined line segment connects the image to the sign. In this way, the image indicating the geographical object is connected to the sign corresponding to the geographical object by the line segment.

The information processing apparatus may further include a display unit for displaying the drawn three-dimensional image. The drawn three-dimensional image is thus displayed.

The sign indicating the display information relating to the geographical object may include at least one of a character, a symbol, a number and a graphic. The sign indicating the display information thus includes at least one of a character, a symbol, a number and a graphic.

In accordance with one embodiment of the present invention, an image display apparatus includes a three-dimensional map data storage unit for storing three-dimensional map data for use in projecting a three-dimensional space on a map onto a plane, a location information storage unit for storing location information including a type of geographical objects at points spaced at predetermined intervals on the map represented by the three-dimensional map data with the location information in association with the respective point, a geographical object information storage unit for storing geographical object information, the geographical object information including a position of a geographical object on the map and display information relating to the geographic object, a placement position setting unit for setting a display information placement position indicating a position of a sign pointing to the display information on the map based on the location information present within a predetermined area of the position of the geographical object indicated by the display information, a drawing unit for drawing a three-dimensional image produced by projecting the three-dimensional space on the map corresponding to the three-dimensional map data onto a plane and drawing the sign at the set display information placement position and a display unit for displaying the drawn three-dimensional image. The position of the sign indicating the display information related to the geographical object on the map is set based on the location information present within the predetermined area of the geographical object corresponding to the display information. The three-dimensional image produced by projecting the three-dimensional space on the map onto the plane is drawn. The sign is then drawn at the display information placement position. The drawn three-dimensional image is then displayed.

In accordance with one embodiment of the present invention, an information processing system includes a map data storage apparatus and an information processing apparatus mutually communicating with the storage apparatus via a predetermined communication line. The map data storage apparatus includes a three-dimensional map data storage unit for storing three-dimensional map data for use in projecting a three-dimensional space on a map onto a plane, a location information storage unit for storing location information including a type of geographical objects at points spaced at predetermined intervals on the map represented by the three-dimensional map data with the location information in association with the respective point, and a geographical object information storage unit for storing geographical object information, the geographical object information including a position of a geographical object on the map and display information relating to the geographic object. The information processing apparatus includes a placement position setting unit for setting a display information placement position indicating a position of a sign pointing to the display information on the map based on the location information present within a predetermined area of the position of the geographical object indicated by the display information. In the information processing system including the map data storage apparatus and the information processing apparatus mutually communicating with the storage apparatus via the predetermined communication line, the position of the sign indicating the display information related to the geographical object on the map is set based on the location information present within the predetermined area of the geographical object corresponding to the display information.

In accordance with embodiments of the present invention, the placement position of the display information related to the geographical object on the map within the three-dimensional image is appropriately set.

DESCRIPTION OF THE PREFERRED EMBODIMENTS

The embodiments of the present invention are described below with reference to the drawings.

Figure 1:
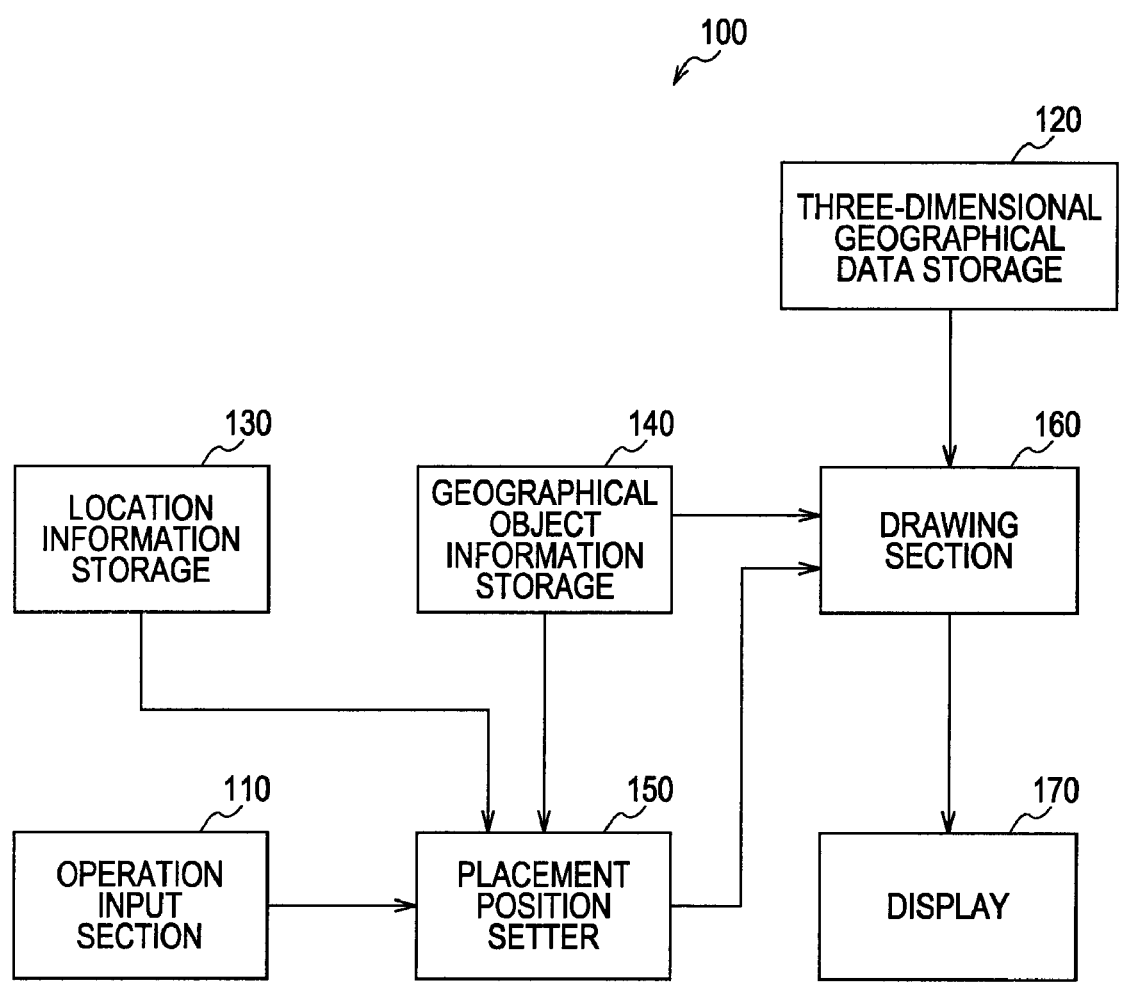
FIG. 1 is a functional block diagram illustrating an information processing apparatus in accordance with one embodiment of the present invention.

FIG. 1 is a functional block diagram illustrating an information processing apparatus 100 in accordance with one embodiment of the present invention. The information processing apparatus 100 is a personal computer including the dedicated display thereof. The information processing apparatus 100 includes an operation input section 110, a three-dimensional geographical data storage 120, a location information storage 130, a geographical object information storage 140, a placement position setter 150, a drawing section 160 and a display 170.

The operation input section 110 includes a keyboard composed of a variety of keys and a mouse (pointing device). Upon receiving an operation input from the mouse or the like, the operation input section 110 outputs the operation input to the placement position setter 150. In response to an operation of the mouse or the like, a three-dimensional image corresponding to a place desired by a user is displayed on the display 170. The user can thus walk through the map virtually. To display an icon within the three-dimensional image related to a geographical object such as a building present on the map, the operation input section 110 receives an operation input to display the icon related to the building within the three-dimensional image.

The three-dimensional geographical data storage 120 stores three-dimensional map data for projecting the three-dimensional space on the map onto a plane and outputs the three-dimensional map data to the drawing section 160.

Figure 2:
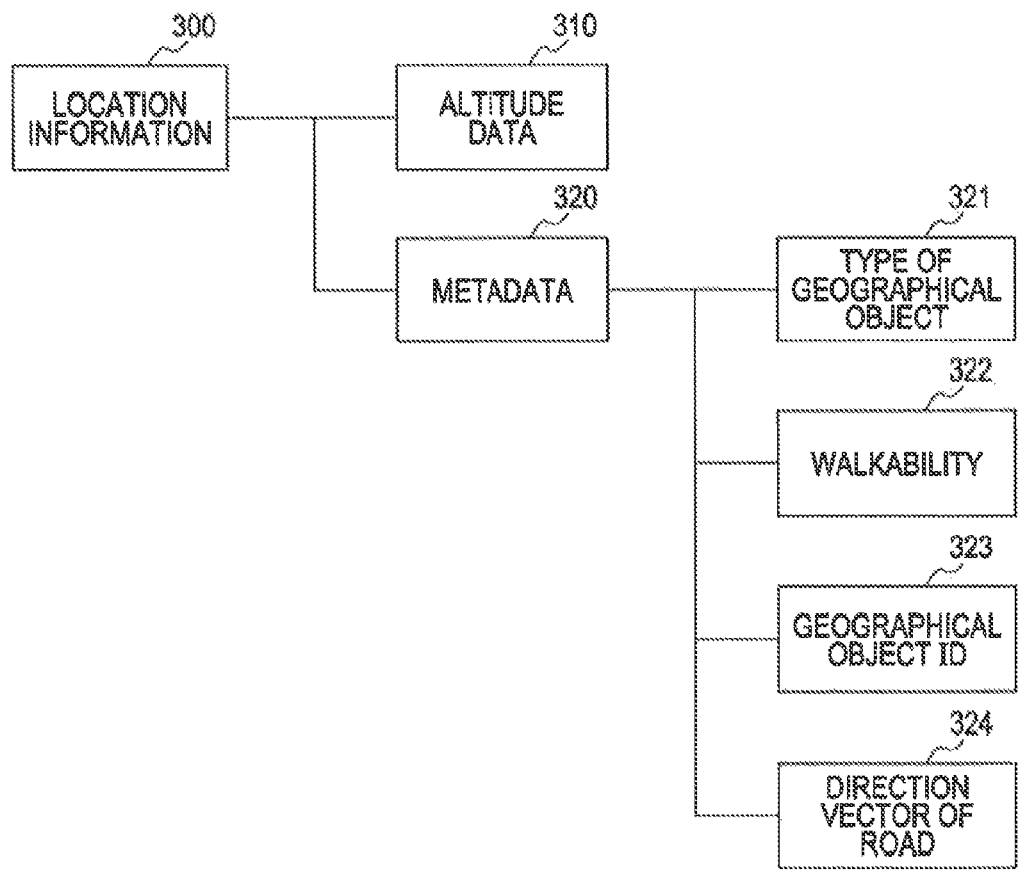
FIGS. 2A and 2B illustrate an example of data structure of location information stored on a location information storage.

The location information storage 130 stores location information at each of points spaced at predetermined intervals on the map corresponding to the three-dimensional image stored on the three-dimensional geographical data storage 120 with the location information in association with the respective point. The location information includes the type of each geographical object and altitude data at each point. The location information storage 130 outputs the location information to the placement position setter 150. The location information stored on the location information storage 130 will be described in detail later with reference to FIG. 2.

The geographical object information storage 140 stores geographical object information including a position of the geographical object present on the map corresponding to the three-dimensional map data stored on the three-dimensional geographical data storage 120 and display information related to the geographical object. A sign indicating display information related to the geographical object is an icon including at least one of a character, a symbol, a number and a graphic. The icon related to the geographical object may be an image representing a shop present at the position of the geographical object, for example. The icon of the geographical object may be character information including a character representing a name of the shop at the position of the geographical object or a character, a symbol, a number, etc., for representing publicity of the shop. The icon of the geographical object may include both an image and character information. For example, the icon of the geographical object may be the one related to a tenant in the building. If the tenant is a hamburger shop, an image of a hamburger and the character information such as the name of the shop may be used for the icon.

The position of the geographical object on the map contained in the geographical object information is representative latitude and longitude of the geographical object. If the geographical object is a building, the representative latitude and longitude of the geographical object thereof are those at the center of the building.

The values of representative latitude and longitude of the geographical object and the display information for drawing the icon of the geographical object are stored as the geographical object information on the geographical object information storage 140. If a plurality of pieces of information are present for a single geographical object, for example, if a plurality of tenants are contained in one building, geographical object information is present for each of the tenants. These pieces of three-dimensional image are stored for the building on the geographical object information storage 140.

Based on the location information present within a predetermined area from the position of the geographical object corresponding to the display information, the placement position setter 150 sets the a position on the map (display information placement position) where the sign indicating the display information related to the geographical object contained in the geographical object information stored on the geographical object information storage 140 is to be placed. The position of the geographical object contained in the geographical object information stored on the geographical object information storage 140 is referred as a base point, and location information of a road type out of location information present within a predetermined area centered on the base point is referred to as reference location information. The placement position setter 150 sets a position identified by the reference location information as a display information placement position of the geographical object at the base point if all location information present within a predetermined area centered on the reference location information indicates the road type and if no location information is present for a building other than the geographical object between the reference location information and the base point. In this case, the predetermined area centered on the base point may be within a circle having a predetermined radius centered on the base point, and the predetermined area centered on the reference location information is within a circle having the predetermined radius centered n the reference location information. The placement position setter 150 sets as an altitude of the sign to be placed at the display information placement position the sum of altitude data contained in the location information at the set display information placement position and a specified value. The placement position setter 150 outputs to the drawing section 160 the set display information placement position and the altitude of the sign indicating the display information at the display information placement position.

The drawing section 160 draws a three-dimensional image for projecting a three-dimensional space on the map corresponding to the three-dimensional map data stored on the three-dimensional geographical data storage 120 onto a plane. At the display information placement position set by the placement position setter 150, the drawing section 160 also draws the sign to be placed at the display information placement position stored on the geographical object information storage 140. The drawing section 160 also draws the sign to be placed at the display information placement position set by the placement position setter 150 and an image representing the geographical object corresponding to the display information contained in the three-dimensional image so that the sign and the image are connected to each other by a line segment.

Figure 8:
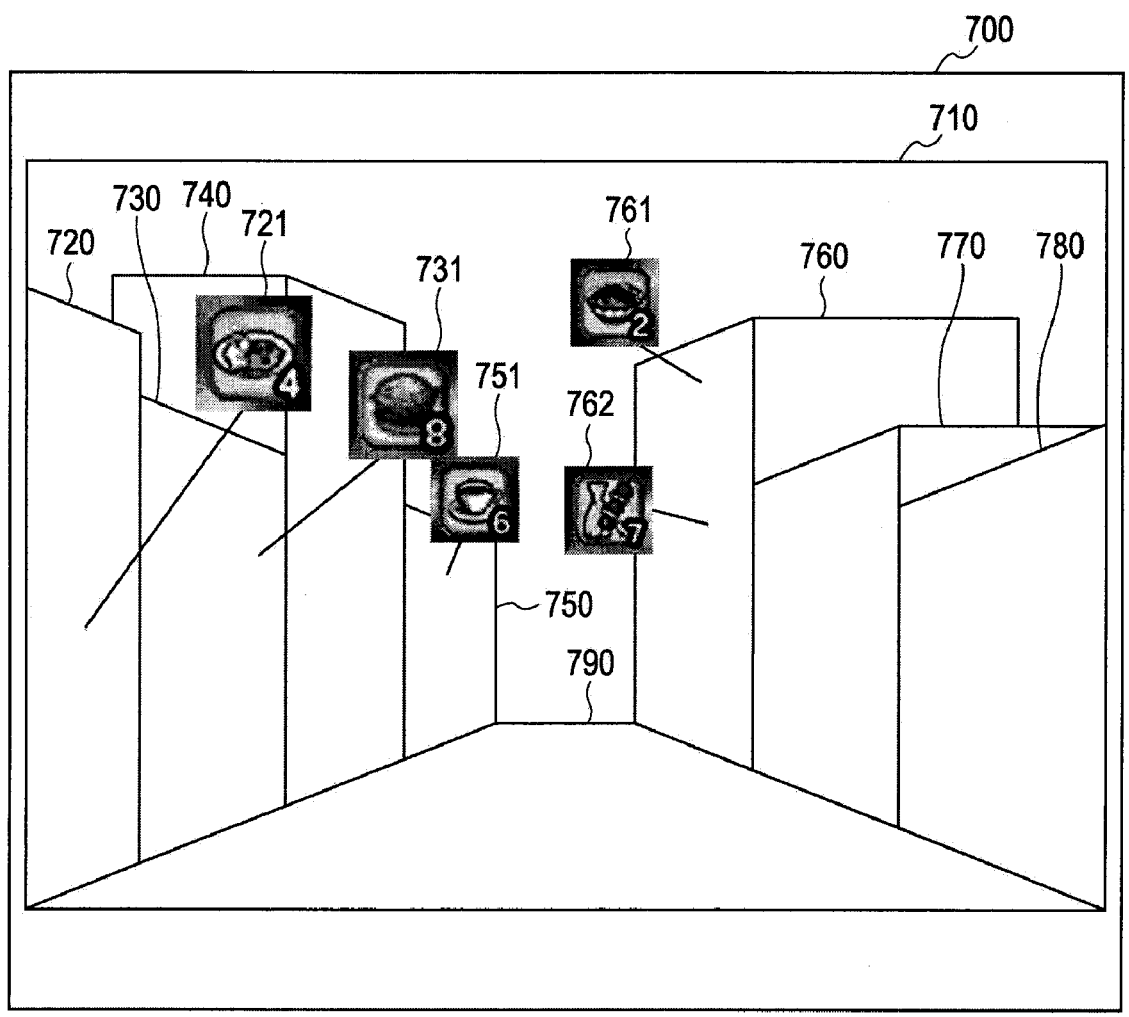
FIG. 8 illustrates one example of a display screen displayed on a display.
Figure 9:
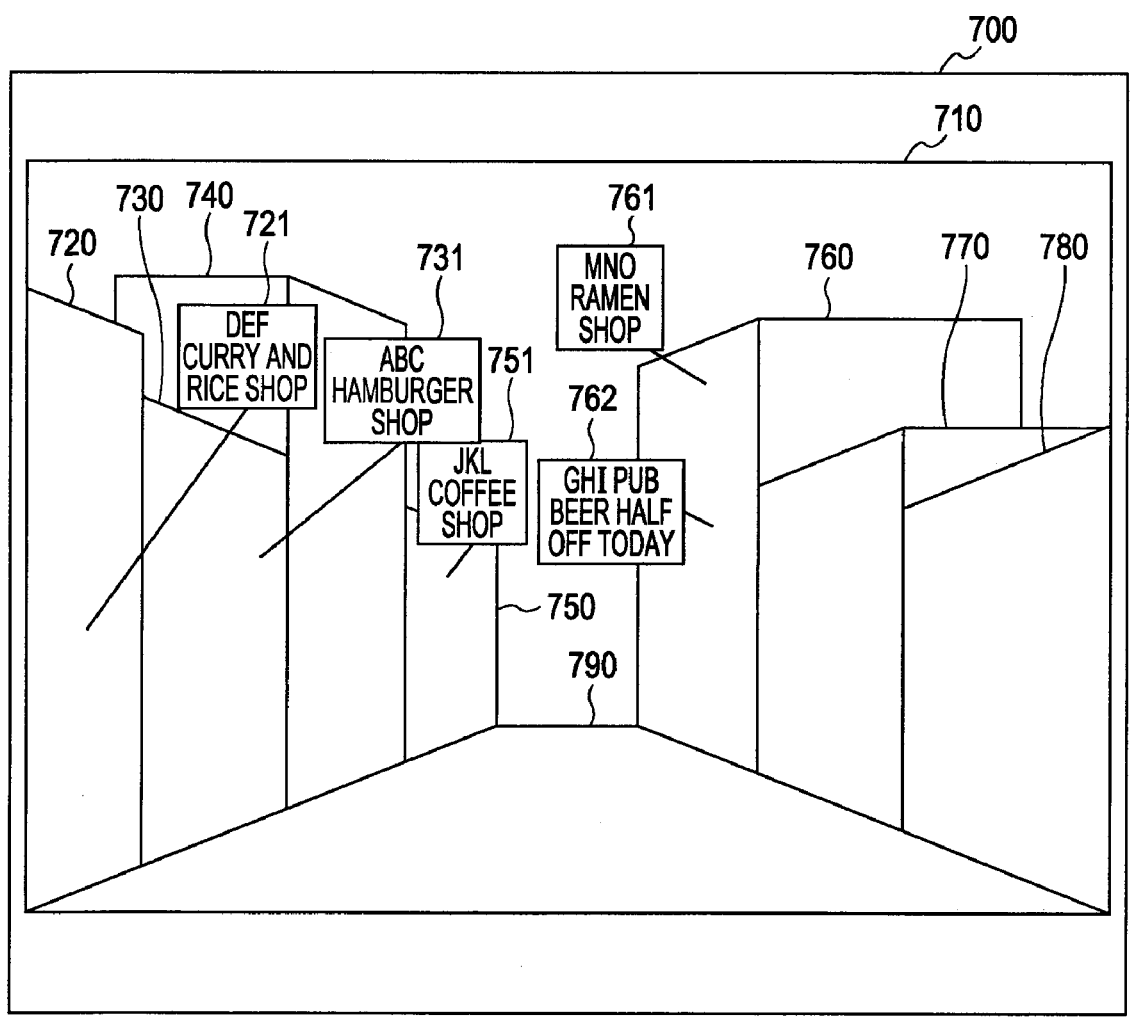
FIG. 9 illustrates another example of the display screen displayed on the display.

The display 170 displays the object drawn by the drawing section 160. For example, three-dimensional images illustrated in FIGS. 8 and 9 are displayed on the display 170.

The information processing apparatus 100 may include an information output unit. The information processing apparatus 100 causes the information output unit to output image information corresponding to the one to be displayed on the display 170. The information processing apparatus 100 displays on another image display the same image as the one displayed on the display 170.

FIGS. 2A and 2B illustrate data structure of location information 300 stored on the location information storage 130. FIG. 2B illustrates part of the location information 300. The location information 300 is grid information. The map is partitioned into small segments (for example, 1 m×1 m) by a grid and altitude and type of a geographical object are stored on each segment of the grid as the grid information. The location information 300 thus covers the surface of the map at predetermined intervals. The location information 300 is also stored on the location information storage 130 with each point at the map stored on the three-dimensional geographical data storage 120 associated therewith. More specifically, the location information 300 contains altitude data 310 and metadata 320.

The altitude data 310 is an altitude value of each point on the map. If a building is present at a point on the map, the altitude value of a roof top of the building is stored. If a road runs under a grade separation structure, an altitude value of the road and an altitude value of a road running above the first road are also stored. The same is true of an iron bridge and an overpass. If a road is covered with something, just like a tunnel, an altitude value of something and an altitude value of the road are stored.

The metadata 320 contains geographical object type 321, walkability 322, geographical object ID 323 and direction vector of road 324. The geographical object is a name of a natural or artificial object present on the ground represented by the map. Stored as examples of the geographical object type 321 of the geographical object are road, building, river, field, etc. The walkability 322 identifies whether the place of interest is walkable or not. In accordance with one embodiment of the present invention, "walkable" is stored for the road and "nonwalkable" is stored for the other objects. The walkability 322 may be omitted, and if a "road" is stored for the geographical object type 321, a "walkable" status may be selected and if an object other than the road is stored from the geographical object type 321, a "nonwalkable" status may be selected. The geographical object ID 323 stores an identification number attached to the geographical object. The direction vector of road 324 stores a value indicating a direction of walk. If the user walks through, for example, the direction vector of road 324 stores a value for correcting a direction of movement. For example, a bearing referenced to zero degree North may be stored for the direction vector of road 324.

Figure 3:
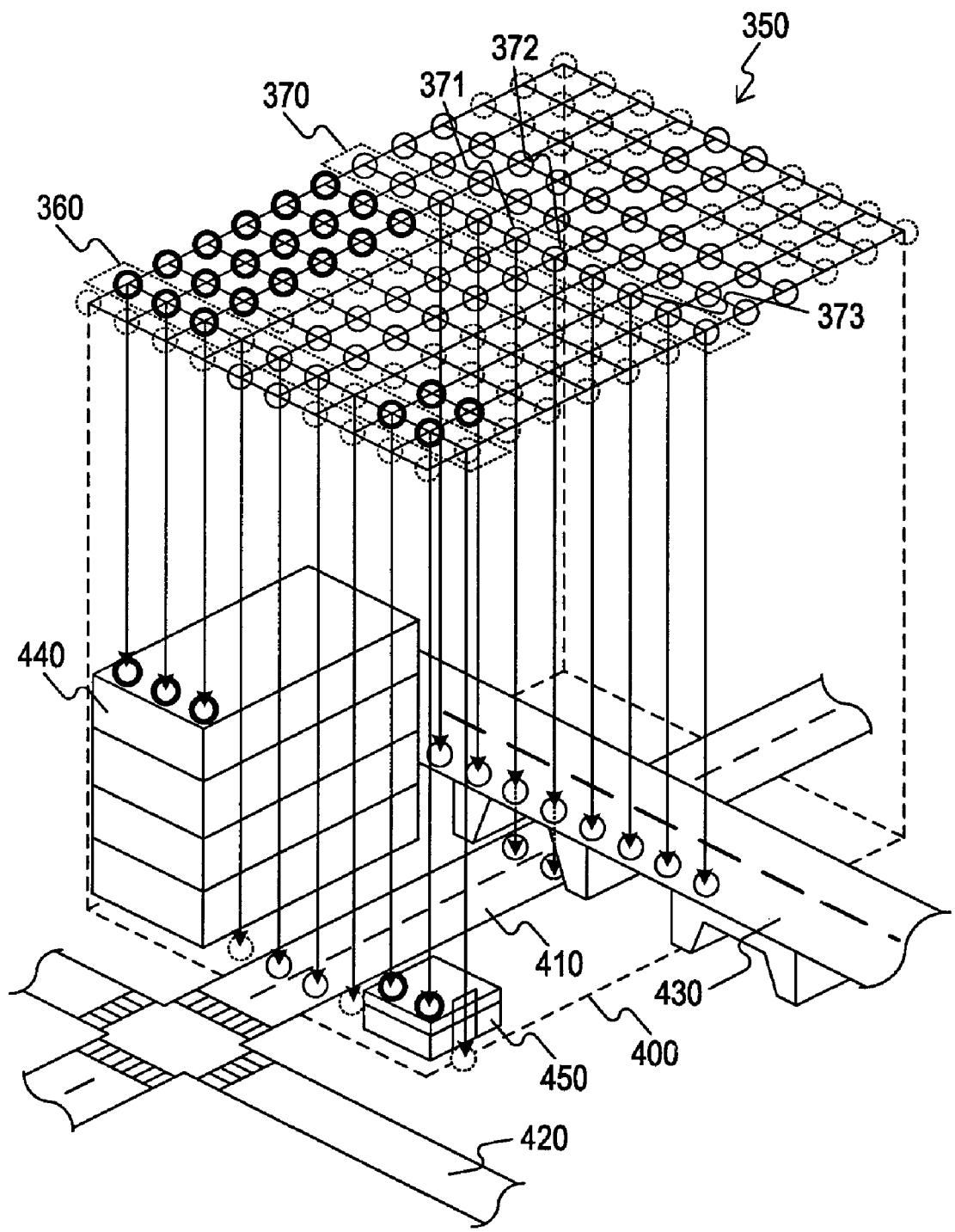
FIG. 3 is a perspective view diagrammatically illustrating a relationship of the location information stored on the location information storage, a map drawn as a three-dimensional image and a geographical object.

FIG. 3 is a perspective view diagrammatically illustrating the relationship of the location information stored on the location information storage 130, and the map and the geographical object drawn in a three-dimensional image. FIG. 4 diagrammatically illustrates the relationship of the location information of FIG. 3 and the map and the geographical object viewed from above.

A road 410 crosses a road 420, and the road 410 crosses a road 430 in a grade separation structure. A building 440 and a convenience store 450 are located on both sides of the road 410. Information groups 350 regarding a predetermined area 400 in this square are now described. In the information groups 350, heavy circles represent location information for each building, thin circles represent location information for each road, and broken circles represent an object other than the road and the building. For example, arrow-headed lines in FIG. 3 indicate correspondence between the a series of location information group 360 contained in the information groups 350 and the map and the geographical object in the predetermined area 400.

A series of location information groups 370 contained in the information groups 350 contains a variety of information regarding the road 430. Each of location information 371 and location information 372 contains the road 430 and the road 410 at the corresponding location, and the road 430 and the road 410 are walkable. For this reason, each of the location information 371 and the location information 372 contains location information for the road 430 and the road 410.

Figure 4A:
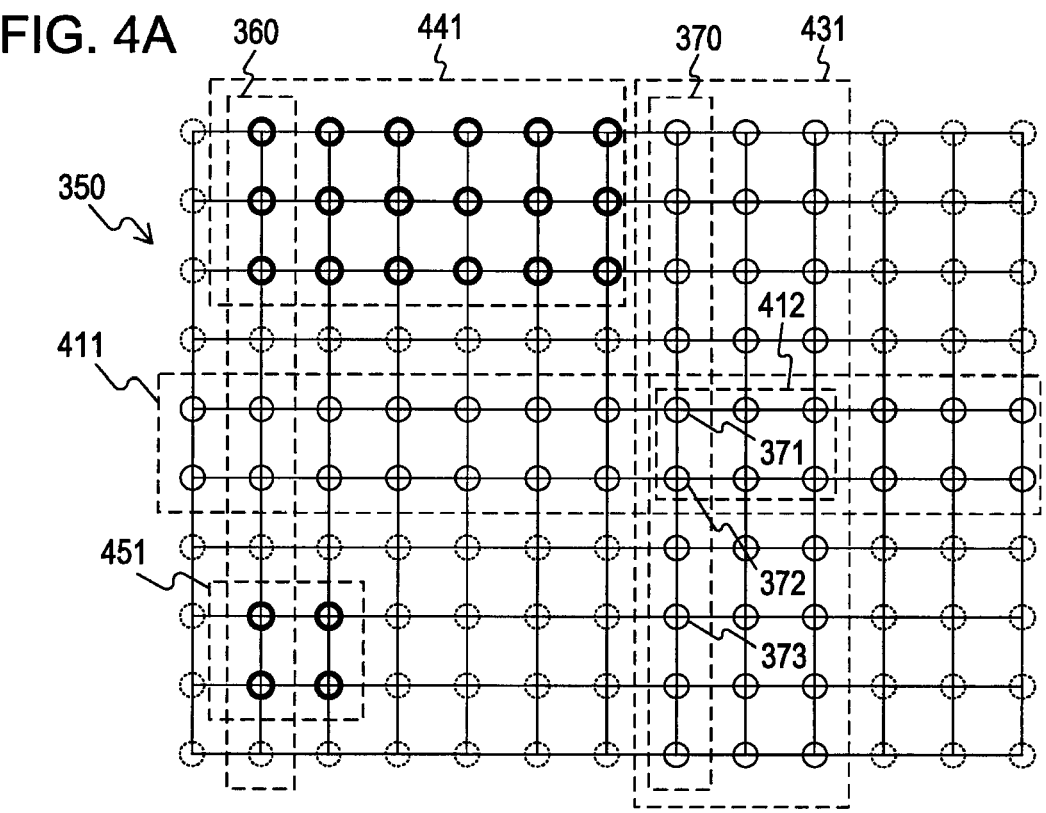
FIGS. 4A and 4B diagrammatically illustrate the relationship of the location information, the map and the geographical object viewed from above.
Figure 4B:
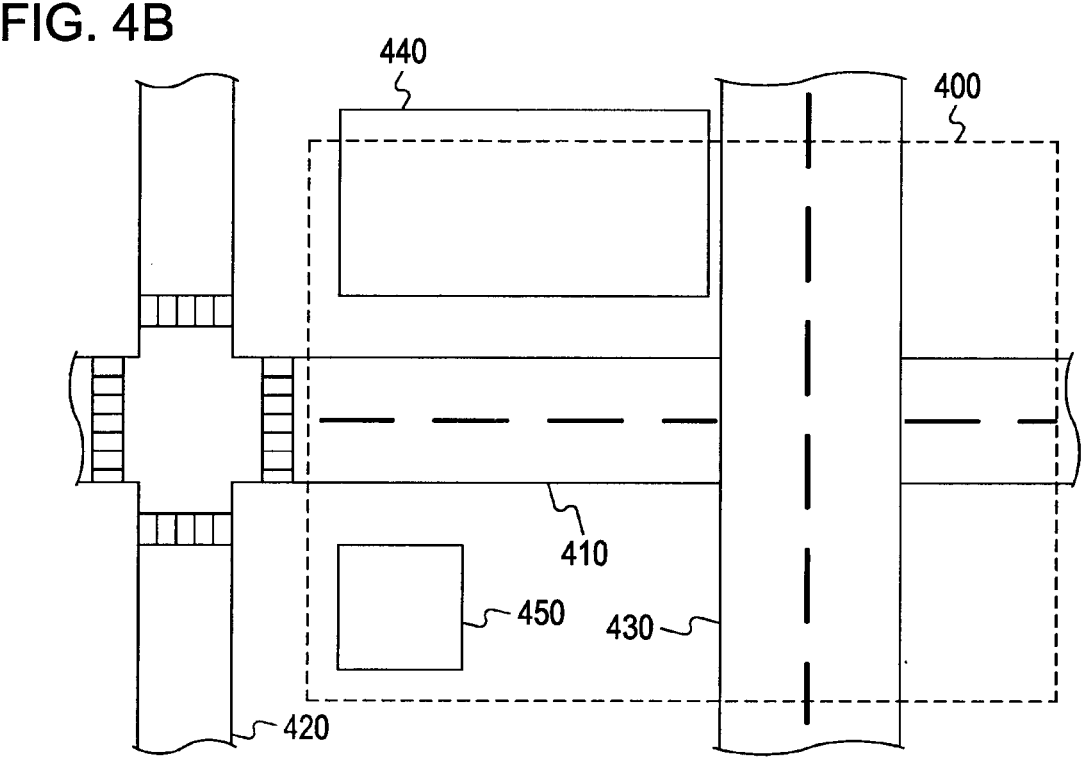

As shown in FIG. 4A, a location information group 411 is an area containing location information for the road 410, a location information group 431 is an area containing location information for the road 430, a location information group 441 is an area containing location information for the building 440, and a location information group 451 is an area containing location information for the convenience store 450. Each of these information groups is stored on the location information storage 130. As shown in FIG. 2B, for location information 373 contained in the location information group 370, "20.33 m" is stored as the altitude data 310, "expressway" is stored as the geographical object type 321, "walkable" is stored as the walkability 322, "10025148" is stored as the geographical object ID 323 and "74.2 degrees" is stored as the direction vector of road 324.

As for location information contained in location information 412 corresponding to the position at the grade separation structure where the road 410 and the road 430 cross each other, the location information storage 130 contains the location information for each of the road 410 and the road 430.

A setting method of setting a position at which a sign is placed is described below with reference to FIGS. 5 through 7. The sign indicates display information related to a geographical object present on the map. In the discussion that follows, an icon is used as the sign indicating the display information related to the geographical object.

Figure 5:
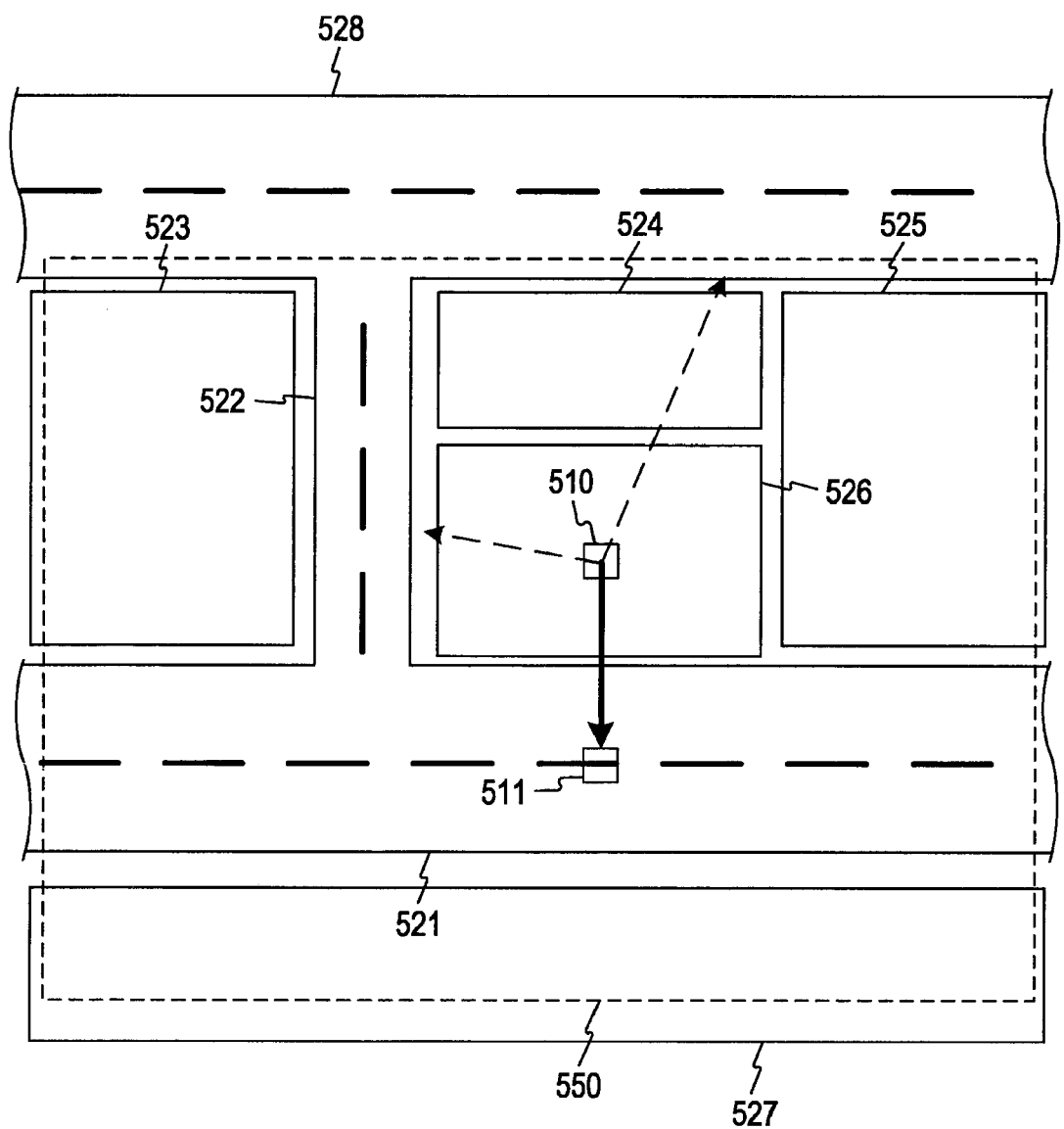
FIG. 5 diagrammatically illustrates the relationship of the location information stored the location information storage, the map drawn as the three-dimensional image and the geographical object viewed from above.
Figure 6:
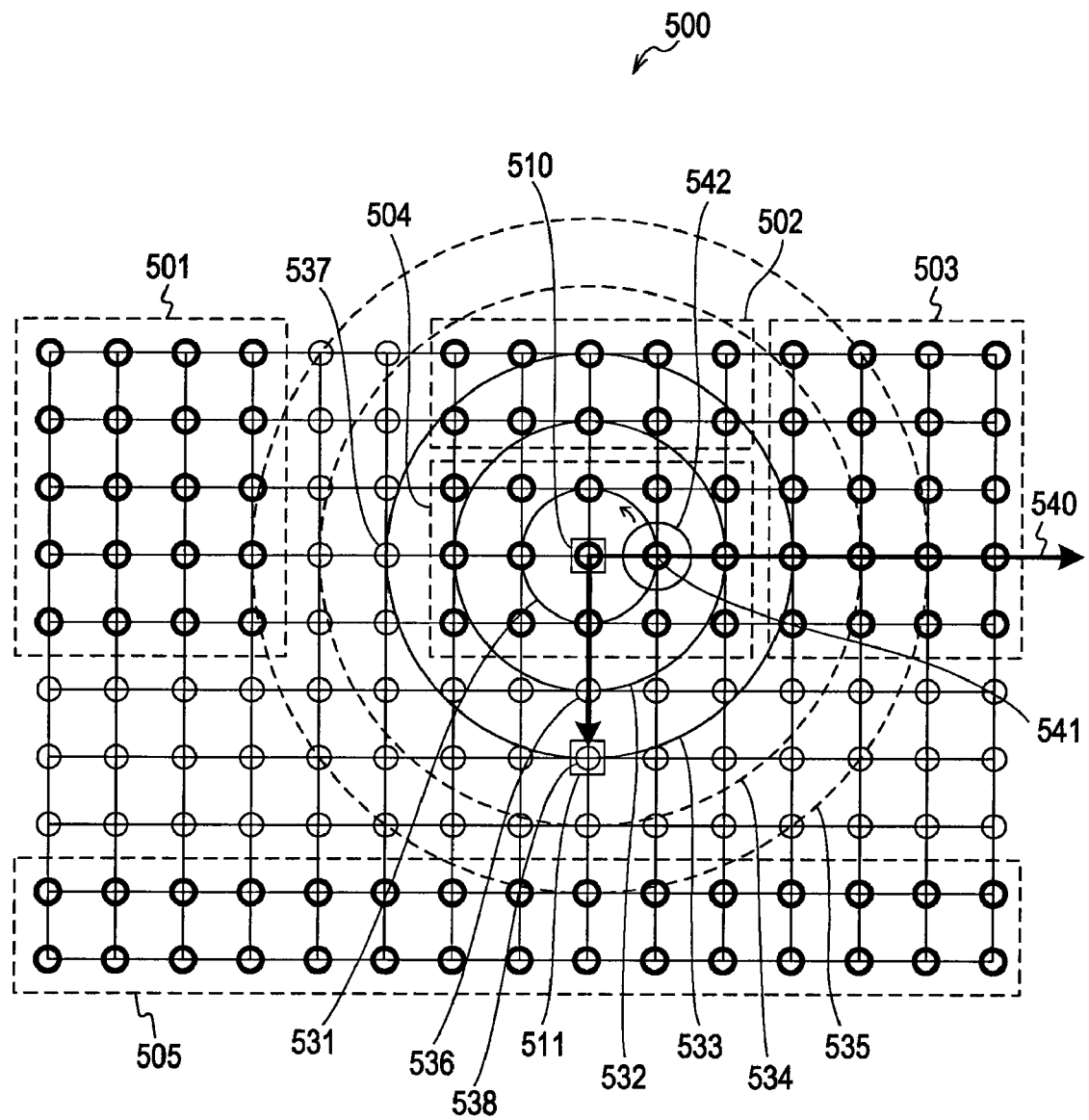
FIG. 6 diagrammatically illustrates the relationship of the location information stored the location information storage, the map drawn as the three-dimensional image and the geographical object viewed from above.

FIGS. 5 and 6 diagrammatically illustrate the setting method of setting the position of the icon on the map related to a building using the location information stored on the location information storage 130. The relationship of the location information stored on the location information storage 130 and the map and the geographical object drawn as the three-dimensional image is viewed from above as illustrated in FIGS. 5 and 6.

As shown in FIG. 5, a road 522 intersects a road 521 and a road 528. A building 527 is located on one side of the road 521 and buildings 523 through 526 are located on the other side of the road 521. A building 523 is on one side of the road 522 and buildings 524 and 526 are on the other side of the road 522. A placement position of an icon corresponding to the building 526 is now set. FIG. 6 illustrates location information groups 500 corresponding to an area 550 of FIG. 5. In the location information groups 500, location information for buildings is represented by a heavy circle, and location information for roads is represented by a thin circle.

As shown in FIG. 6, a location information group 501 is an area containing location information for the building 523, a location information group 502 is an area containing location information for the building 524, a location information group 503 is an area containing location information for the building 525, a location information group 504 is an area containing location information for the building 526, and a location information group 505 is an area containing location information for the building 527. Each of these location information groups is stored on the location information storage 130. A base point 510 at the center of the building 526 serves as a reference when a placement position is determined on the map. The base point 510 is determined based on a position of the geographical object on the map stored on the geographical object information storage 140. The center point of the building 526 is set up as a base point. Alternatively, a point other than the center position of the building 526 may be set up as a base point.

A circle having a predetermined radius centered on the base point is set up, and location information present on the circumference of a circle or location information present within a predetermined area from a point on the circumference are successively retrieved. For example, a circle (search area) having a predetermined radius centered on a predetermined point on the first circle is set up. Location information present within the circle is successively retrieved. The predetermined point is shifted along the circumference of the circle in steps of predetermined range. It is then determined whether the retrieved location information is related to road or not. The predetermined radius of the circle centered on the base point may be a distance from the base point to the position of location information closest to the base point. This is intended to retrieve successively location information in the order of from near to far location information. The predetermined radius of the circle as the search area is half the distance between one piece of location information and another piece location information. The shift distance of the circle as the search area may be an arc subtending a predetermined central angle (of 5 degrees, for example) in the circle centered on the base point. In this setting, all location information present on the circle centered on the base point and present within the predetermined area from the point on the circle can be successively retrieved.

If the retrieved location information is not related to road, a circle having an increased radius is set up. Location information present on the circumference of the circle or present within a predetermined area of a position on the circumference of the circumference is successively retrieved to repeat the above-described operation.

If the retrieved location information is related to road, a predetermined area surrounding the location information (for example, a circle having a predetermined radius centered on the location information) is set up. Location information within the predetermined area is successively retrieved. It is then determined whether all location information within the predetermined area is related to road. If it is determined that all location information within the predetermined area is related to road, positions corresponding to the location information serving as a reference are on a road having a predetermined width. A position corresponding to the location information is set up as a candidate for a placement position of an icon. If it is determined that none of all location information within the predetermined area is related to road, the position corresponding to each location information serving as reference is not set up as a candidate for the placement position of the icon. Another piece of location information is processed as described above.

The placement position of one icon is set up after repeating the above process. The setting of the placement position of the icon is thus completed. When the radius of the circle centered on the base point becomes larger than a predetermined value with a search operation completed on a plurality of circles, the setting of the placement position of the icon is also completed. If the placement position of the icon cannot be set up, the setting of the placement position of the icon is considered to be aborted, and the base point may be set up as the placement position of the icon. Even if the placement position of one icon is set up, the search operation of the placement position of the icon may be continued until the search operation on the circumference of the circle is completed.

As shown in FIG. 6, a circle 531 centered on the base point 510 is set up, and a circle 542 centered on a point 541 on the circumference of the circle 531 is set up. Location information present in the circle 542 is retrieved. Since the location information present within the circle 542 is not related to road, the circle 542 is shifted. For example, an arrow-headed line 540 is set as zero degree. The center of the circle 542 is shifted to a shift point counterclockwise along the circumference of the circle 531 to make an arc so that the arc made between the arrow-headed line 540 and that shift point subtends a predetermined angle as a central angle (for example, 5 degrees) in the circle 531. That shift point on the circumference of the circle 531 is set as a shift point of the search area. When the circle centered on the shift point on the circumference has finished moving along all the circumference of the circle 531, four pieces of location information present on the circumference of the circle 531 are successively retrieved. Since the four pieces of location information are not related to road, a next circle 532 is set up. As with the circle 531, location information present on the circumference of the circle 532 is retrieved. Location information 536 related to road is present on the circumference of the circle 532. However, not all location information present within a predetermined area surrounding the location information 536 on the circumference of the circle 532 is related to road. The position corresponding to the location information 536 is not set up as the placement position of the icon. The predetermined area may be an area surrounded by a circle having a radius equal to a distance value to the location information. A next circle 533 is then set up. In this way, the search operation searching for the placement position of the icon is repeated from the circle 531 to the circle 533. When a next circle is set up, the radius thereof may be increased by a distance value between one piece of location information and next piece of location information.

Location information 537 related to road is present on the circumference of the circle 533. However, not all location information within a predetermined area around the location information 537 on the circumference of the circle 533 is related to road. A placement position of the icon is not set up at the position for the location information 537.

A position 511 for location information 538 is determined to be on the road 521 having at least a predetermined width.

The position 511 for the location information 538 is set up as a placement position of the icon.

For example, a position on the road 528 is set up as a candidate for a position as the placement position of the icon. The road 528 does not adjoin the building 526 to be searched and the building 524 is present between the road 528 and the building 526. The icon for the building 526 can be hidden by the building 524. If a position on the road 528 is set up as a candidate for the placement position of the icon, the position setting is canceled. The cancellation of the placement position of the icon will be described in detail later with reference to FIG. 7.

When the placement position of the icon is set up, an altitude at which the icon is drawn is set up. The altitude of the icon is set based on the altitude data contained in the location information present at the placement position of the icon. For example, "a value of altitude data+20 m" is calculated and set the altitude of the icon. By setting as the icon altitude the sum of the value of altitude data and a specified value, an icon is displayed at a position on the road corresponding to the placement position of the icon to which a line of sight of the user is easily directed.

Figure 7:
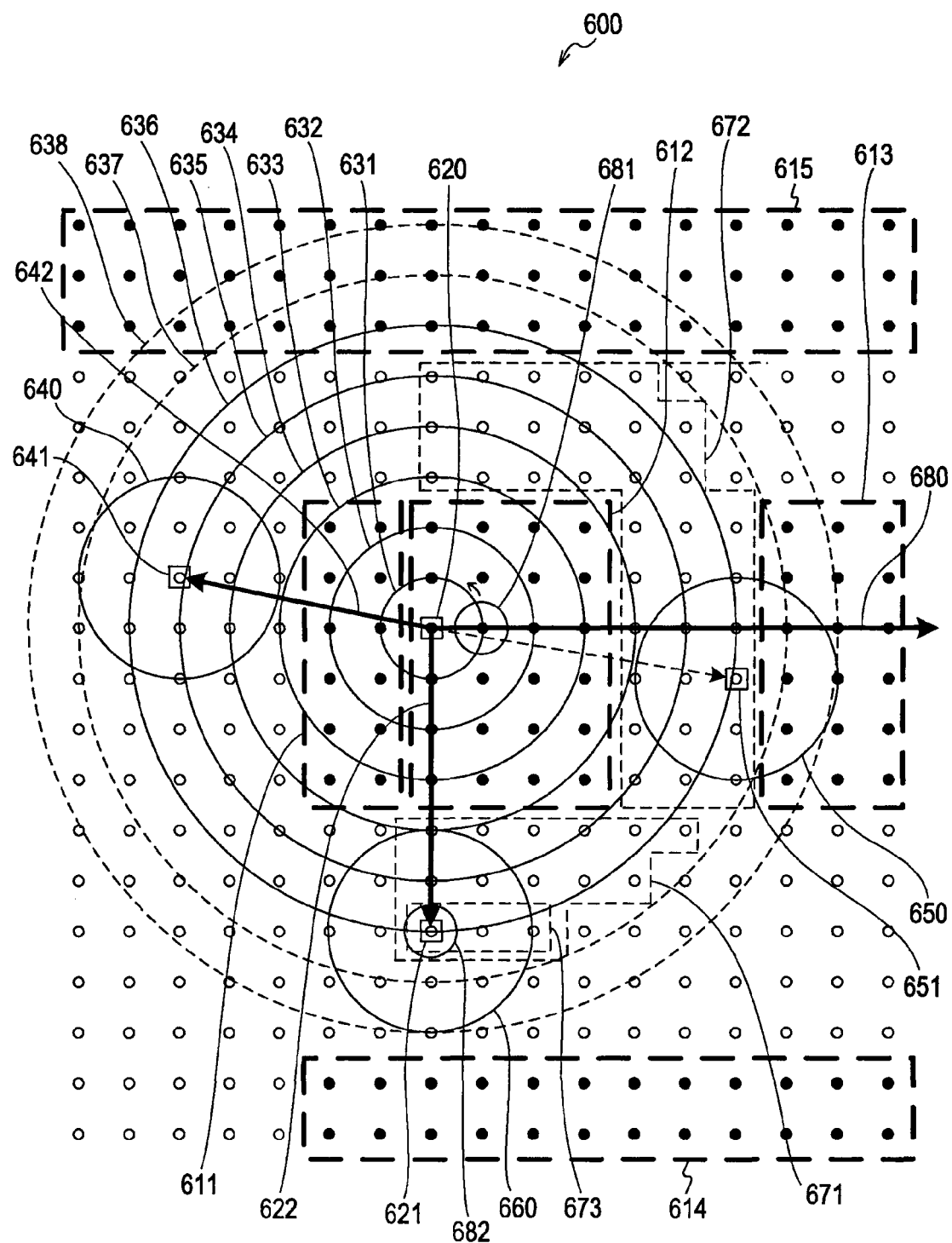
FIG. 7 diagrammatically illustrates a setting method of setting a position of an icon on the map using the location information.

FIG. 7 illustrates the setting method of setting the icon related to the building on the map using the location information stored on the location information storage 130.

Location information groups 600 corresponding to a position on the map stored on the three-dimensional geographical data storage 120 are described. Four buildings are present in a zone corresponding to the location information groups 600, and location information for these buildings are location information groups 611 through 615. In the location information groups 600, location information for buildings is represented by a solid circle, and location information for roads is represented by a blank circle. An icon related to the building corresponding to the location information 612 is now placed on the map. A base point 620 of the building corresponding to the location information 612 is represented by a blank square. In this case, the base point is distanced from the center of the building.

First, a circle 631 is set up at the base point 620. A circle 681 is successively shifted along the circumference of the circle 631 as the search area. Location information present is successively retrieved from within the area of the circle 681 at each position. For example, the circle 681 is shifted along the circumference of the circle 631 in steps of arc in a counter-clockwise direction, each arc subtending a central angle of predetermined degrees (for example, 5 degrees), starting with an arrow-headed line 680 at zero degree in the circle 631.

For example, circles 631 through 636, centered on the base point 620, are set up. Location information present on the circumference of each circle and present within a predetermined area of a point on the circumference of each circle is retrieved. The search operation searching for the placement position of the icon is then performed. This process is repeated. The radius of each circle is then increased in steps of distance between one piece of location information and next piece of location information.

If the location information present on the circumferences of the circles 631 through 636 and present within the predetermined area of each circumference is related to road, a circle having a predetermined radius centered on the location information is set as a predetermined area. It is then determined whether all location information within the predetermined area is related to road. The predetermined area, such as circles 640, 650 and 660, is set up using a value twice the distance between one piece of location information and next piece of location information. If all location information within the predetermined area centered on the location information related to road is related to road, a position corresponding to the location information in the center is set up as a candidate for the placement position of the icon.

As shown in FIG. 7, the search operation for the placement position of the icon is repeated for each piece of location information present on the circumferences of the circles 631 through 636 and present within the above-described predetermined area of each circumference. For example, location information contained in the location information groups 611 through 615 is not related to road, and is not set up for a candidate of the placement position of the icon.

For example, location information contained in a location information group 672 is related to road, but at least part of location information present within the predetermined area centered on the location information is not related to road. The position of the location information is not set up as a candidate of the placement position of the icon. For example, part of location information present within an area of the circle 650 centered on the location information corresponding to a position 651 is contained in the location information group 613. Since part of location information present within an area of the circle 650 centered on the location information corresponding to the position 651 is not related to road, the location information is not set up as a candidate for the placement position of the icon.

A road at the position determined as a candidate of the placement position of the icon may not adjoin a building as a target of search. For example, another building may be present between the road at the position determined as a candidate of the placement position of the icon and the building as the target of search. The other building may hide the icon. To prevent the icon from being hidden, location information present on a line segment connecting the position determined as a candidate of the placement position of the icon and the base point and present within a predetermined area of the line segment is successively retrieved. It is then determined whether the retrieved location information is related to a building other than the building as a target for search. If it is determined that none of all location information retrieved is related to the other building, no other building is determined to be present between the position determined as a candidate of the placement position of the icon and the base point, and the position corresponding to that location information is set up as the placement position of the icon. On the other if it is determined that part of the retrieved location information is related to the other building, the position setting of the position determined as a candidate of the placement position of the icon is canceled. The above determination is then repeated for other location information.

Location information present on the left side of the location information group 611 is related to road, and all location information present within a predetermined area centered on the location information is related to road. The location information is thus set up as a candidate of the placement position of the icon. For example, all location information present within an area of a circle 640 centered on the location information corresponding to a position 641 is related to road. However, location information present on a line segment of an arrow-headed line 642 connecting the base point 620 to the position 641 and present within a predetermined area of the line segment contains location information for a building contained in the location information group 611, and thus part of the location information contains information related to the other building. The position setting of the position 641 as a candidate of the placement position of the icon is thus canceled.

For example, location information contained in location information groups 671 is related to road. Location information contained in a location information group 673 within the location information groups 671 is set up as a candidate of the placement position of the icon because all location information present within a predetermined area of the location information is related to road. For example, all location information present within an area of a circle 660 centered on location information corresponding to a position 621 contained in the location information group 673 is related to road. As for location information present on a line segment of an arrow-headed line 622 connecting the base point 620 to the position 621 and present within a predetermined area of the line segment, location information corresponding to a building other than location information corresponding to a building contained in the location information 612 is not present. For example, a circle 682 is shifted along the circumference of the circle 636 in steps of arc in a counterclockwise direction, each arc subtending a central angle of predetermined degrees (for example, 5 degrees), starting with an arrow-headed line 680 at zero degree in the circle 636. A position 621 is thus set as an icon placement position. If all circumference of the circle 636 has been searched, a position corresponding to location information contained the location information group 673 may be set as a icon placement position.

FIGS. 8 and 9 illustrate a display screen 700 to be presented on the display 170. A three-dimensional image 710 is displayed on the display screen 700. The three-dimensional image 710 illustrated in FIG. 9 is a modification of the three-dimensional image 710 illustrated in FIG. 8.

The three-dimensional image 710 is a two-dimensional stereoscopic image that is obtained by projecting a three-dimensional figure onto a plane and an actual scene on the map viewed at the height of a viewpoint of a human. For example, when the user walks on a road in Shibuya, Tokyo, buildings 720, 730, 740, 750, 760, 770 and 780 that could be actually seen are drawn as the three-dimensional image 710. When each building contained in the three-dimensional image 710 is drawn, an object having nothing on the surface thereof (an object corresponding to the building) is arranged in the three-dimensional space based on the three-dimensional map data stored on the three-dimensional geographical data storage 120. A side image of each building corresponding to each object is glued on each surface of the object. Each building contained in the three-dimensional image 710 is thus drawn. Roads and buildings drawn in the three-dimensional image 710 are virtual.

For example, a road 790 has a predetermined width thereacross. Icons for buildings located on both sides of the road 790 are overlaid on the images of the road and the buildings contained in the three-dimensional image 710 on the display 170. As shown in FIGS. 8 and 9, the icon is connected to the corresponding building using a line so that the icon is anchored to the corresponding building in the three-dimensional image 710.

For example, an icon 721 is related to a curry and rice shop as a tenant in a building 720, an icon 731 is related to an hamburger shop in a building 730, an icon 751 is related to a coffee shop in a building 750, an icon 761 is related to a ramen shop in a building 760, and an icon 762 is related to a pub in the building 760.

As shown in FIG. 8, images related to the shops are used as icons drawn in the three-dimensional image 710. As shown in FIG. 9, characters related to the shops are used as icons drawn in the three-dimensional image 710. A variety of types of characters may be contained in each icon, for example, a message "beer half off today" contained in the icon 762. An image, a character, a symbol, a number, etc. may be combined in each icon.

The buildings and the icons related to the respective buildings are drawn at a height on the road 790 having a predetermined width or more. The user walking through the road 790 using the information processing apparatus 100 can easily recognize the relationship of the icons and the respective buildings.

Operation of the information processing apparatus 100 in accordance with one embodiment of the present invention is described below with reference to a flowchart of FIG. 10.

Figure 10:
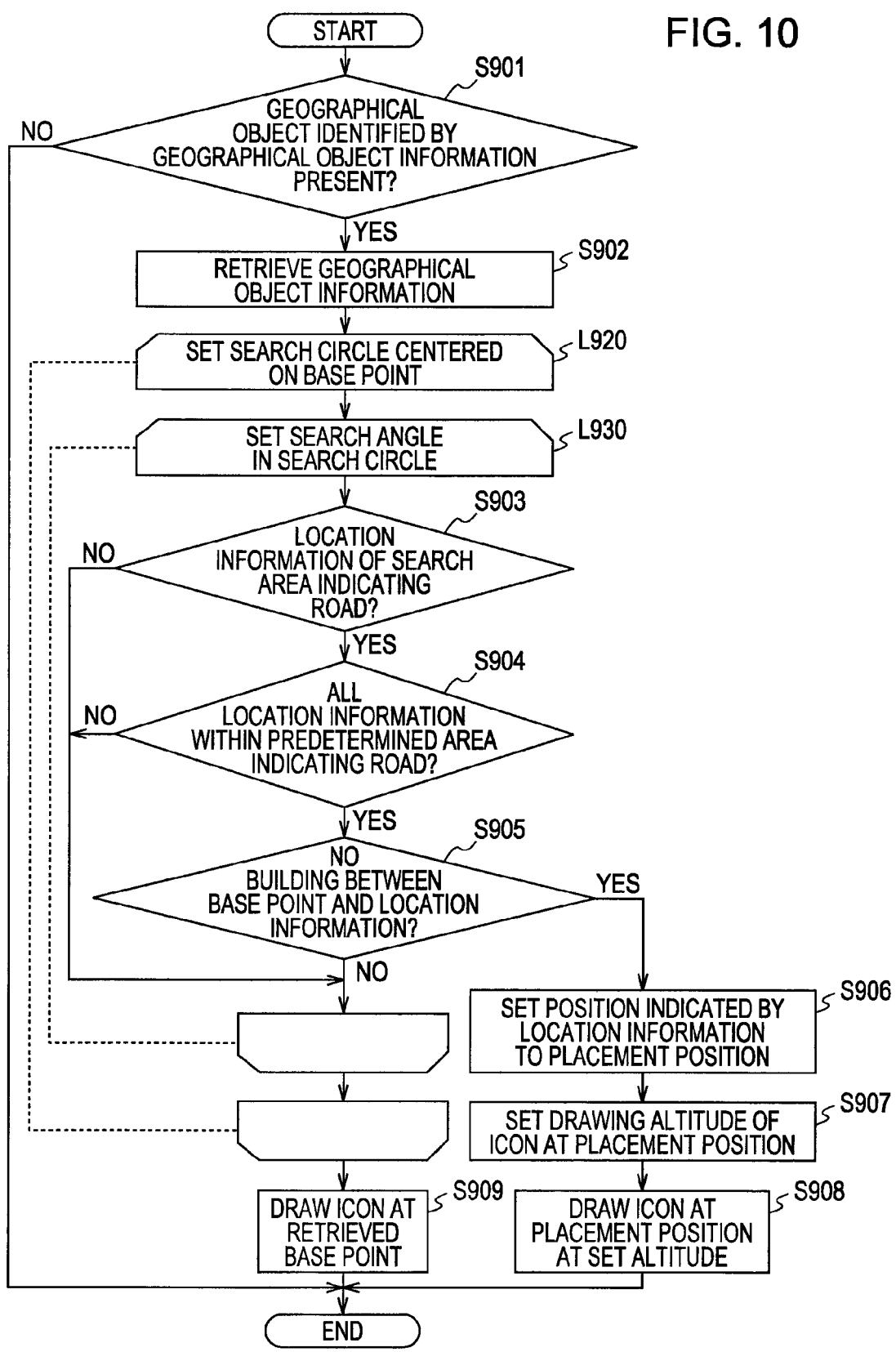
FIG. 10 is a flowchart illustrating a setting process of setting a placement position of the icon on the information processing apparatus.

FIG. 10 is the flowchart illustrating a setting process of the icon placement position performed by the information processing apparatus 100.

The information processing apparatus 100 determines whether the geographical object information storage 140 stores the geographical object information of the geographical object present on the map corresponding to the three-dimensional image displayed on the display 170 (step S901). If it is determined in step S901 that the geographical object information storage 140 does not store the geographical object information, the setting process of the icon placement position is quit.

If the geographical object information storage 140 stores the geographical object information (step S901), the geographical object stored on the geographical object information storage 140 and the location information stored on the location information storage 130 are retrieved (step S902).

With reference to the base point of the geographical object on the map contained in the retrieved geographical object information, a circle having a predetermined radius centered on the base point is set up (step L920). A search angle is set up along the circumference of the set circle (step L930). A predetermined direction is set as zero degree with reference to the base point of the geographical object on the map. From the predetermined direction, the search area is shifted in steps of predetermined angle along the circumference of the set circle. The search area is a predetermined area containing a position on the circumference of the set circle.

The location information contained in the search area is retrieved (step S903). The location information present on the circumference of the circle having a predetermined radius centered on the base point of the geographical object and present within a predetermined area from a position on the circumference is successively retrieved. As shown in FIG. 7, the circle 631 centered on the base point 620 is set up (step L920). With the direction of the arrow-headed line 680 set as zero degree from the base point 620, a search angle is set to shift the circle 681 as the search area of the predetermined area on the circumference of the circle 631 (step L930).

The circle 681 is shifted counterclockwise along the circumference of the circle 631 in steps of predetermined angle. The location information contained in the circle 681 is successively retrieved. It is then determined whether the retrieved location information is related to road (step S903). If it is determined in step S903 that the retrieved location information is related to road, a predetermined area is set up around the location information. Location information within the predetermined area is successively retrieved. It is then determined whether all location information within the predetermined area is related to road (step S904).

If it is determined in step S904 that all location information is related to road, location information present on a line segment connecting the location information in the center of the predetermined area and present within the predetermined area from the line segment is successively retrieved. It is then determined whether the retrieved location information is related to another building other than the geographical object corresponding to the base point (step S905).

If it is determined in step S905 that none of all the retrieved location information is related to the other building (step S905), the position corresponding to the location information is set up as the icon placement position corresponding to the base point (step S906). The altitude data contained in the location information corresponding to the set icon placement position is then retrieved. The altitude of the icon to be drawn at the icon placement position is set based on the value of the retrieved altitude data and the specified value (step S907).

For example, the location information corresponding to the position 621 of FIG. 7 is related to road (step S903). The circle 660 centered on the location information is set up and the location information within the area of the circle 660 is successively retrieved. All the location information within the area of the circle 660 is related to road (step S904).

The location information present on a line segment connecting the location information corresponding to the position 621 to the base point 620 and present within the predetermined area from the line segment is successively retrieved. It is then determined whether the retrieved location information is related to another geographical object. None of all location information present on a line segment connecting the location information corresponding to the position 621 to the base point 620 and present within the predetermined area from the line segment is related to the other building (step S905). The position 621 is set up as a placement position of the icon related to the base point 620 (step S906). The altitude data contained in the location information corresponding to the position 621 is retrieved. The altitude of the icon to be drawn at the position 621 is set based on the retrieved altitude data and the specified value (step S907).

The retrieved location information is not related to road (step S903). None of all location information within a predetermined area centered on the location information related to road is related to road (step S904). At least part of location information present on a line segment connecting the location information centered on the predetermined area to the base point and present within the predetermined area from the line segment is related to another building other than the geographical object at the base point (step S905). In such a case, processing proceeds to one of steps L920 and L930. The search operation of the icon placement position is then repeated (steps S903 through S905).

When all angles around the circumference of the set circle are searched, a circle having an increased radius is set up (step L920). When the searching of all angles around the circumference of the set circle is not yet completed, the search angle is advanced along the circumference of the set circle (step L930). The search operation of the icon placement position is then repeated (steps S903 through S905).

The icon placement position and the icon altitude to be drawn in the placement position are set (step S907). The icon contained in the geographical object information stored on the geographical object information storage 140 is drawn at the set altitude at the icon placement position in the three-dimensional image (step S908). The three-dimensional image is produced as a result of projecting a three-dimensional space on the map corresponding to the three-dimensional map data stored on the three-dimensional geographical data storage 120.

If the radius is increased above a predetermined value (step L920) after the search of circumferences of a plurality of circles is completed (steps S903 through S905), the setting process of the icon placement position is completed. If the icon placement position cannot be set up (steps S903 through S907), the setting process of the icon placement position is considered to be aborted. The base point is set up as an icon placement position, and the icon contained in the geographical object stored on the geographical object information storage 140 is drawn at the predetermined altitude at the position corresponding to the set base point (step S909).

If one icon is set up at the placement position in the process of FIG. 10, the setting process of the icon placement position is completed. Alternatively, the search of the icon placement position may be continued until the radius of the circle for searching may reach a predetermined value. If a plurality of icon placement positions are set up in such a case, the icon placement position closest to the base point may be selected from the plurality of icon placement positions.

The three-dimensional map data, the location information and the geographical object may be pre-stored on the storages in the information processing apparatus 100. Three-dimensional map data of a predetermined area (for example, 40 m×40 m) containing a present position and location information and geographical object corresponding to the three-dimensional map data may be retrieved from the storage and then stored onto the three-dimensional geographical data storage 120, the location information storage 130 and the geographical object information storage 140, respectively. Similarly, the three-dimensional map data, the location information and the geographical object information may be stored on a storage external to the information processing apparatus 100 and the information processing apparatus 100 may retrieve these pieces of information from the external storage as necessary.

A modification of the present embodiment is described in detail below.

Figure 11:
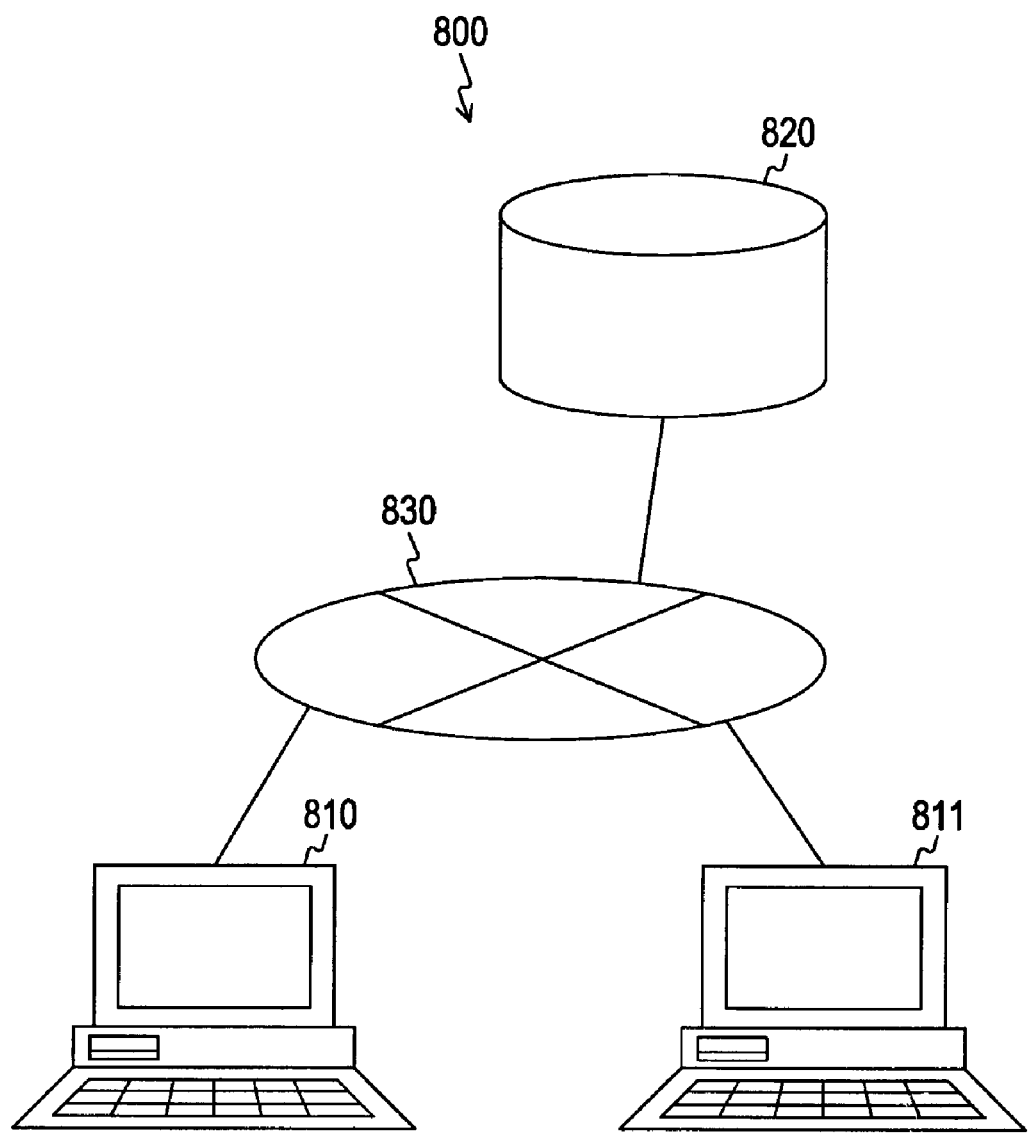
FIG. 11 is a functional block diagram illustrating an information processing system as one modification of the embodiment of the present invention.

FIG. 11 is a functional block diagram illustrating an information processing system 800 as the modification of the present embodiment of the invention.

The information processing system 800 includes an information processing apparatus 811, a map database 820 and a network 830. For example, the map database 820 pre-stores the three-dimensional map data, the location information and the geographical object information. Information processing apparatuses 810 and 811 may retrieve from the map database 820 via the network 830 three-dimensional map data of a predetermined area (for example, 40 m×40 m) containing a present position and location information and geographical object corresponding to the three-dimensional map data and then use the retrieved data. A communication network such as the Internet may be used for the network 830.

The setting of the placement position of the icon related to the geographical object present on the map corresponding to the three-dimensional image displayed on the display 170 has been discussed in connection with the embodiments. The present embodiment is also applicable when the icon placement position is set for all or part of the geographical objects on the map corresponding to the three-dimensional map data stored on the three-dimensional geographical data storage 120.

An icon of a geographical object (such as a building) may be displayed on the map in order to describe the display information related to the geographical object on the map corresponding to the three-dimensional map data. If the icon can be three-dimensionally displayed, the user can recognize the icon intuitively. It is thus important for the icon placement position to satisfy the following three conditions (1) through (3):

(1) the icon placement position is external to the corresponding building but not spaced from the building;

(2) the icon placement position is not inside another building; and (3) the icon placement position is placed at a position easily visible to the user.

A position satisfying the three conditions (1)-(3) is typically in space above the road adjoining the corresponding building. If there are a plurality of roads as candidates for the icon placement position (for example, if the building faces a plurality of roads), a wider road is preferable. However, it is a time consuming job to search manually for the icon placement position.

In accordance with one embodiment of the present invention, the icon placement position satisfying the above conditions (1)-(3) is automatically set up on the map corresponding to the three-dimensional map data stored on the three-dimensional geographical data storage 120. Since it is not necessary to calculate a figure in space in the three-dimensional image, the setting process of the icon placement position is performed at fast speed even with a personal computer or an built-in device having limited performance specifications.

The information processing apparatus 100 can thus provide the user with a variety of information related to a place where the user is now walking through.

Since the setting process of the icon placement position is performed at fast speed, reduction in tracking speed is reduced. Since the variety of information relating to the place where the user is walking through is appropriately provided, the user can enjoy walk-through.

In accordance with embodiments of the present invention, the placement position of the display information related to the geographical object on the map corresponding to the three-dimensional image is appropriately set. The sign indicating the display information related to the geographical object at an appropriate position is drawn in the three-dimensional image that is obtained from projecting the three-dimensional space onto a plane.

In accordance with embodiments of the present invention, the information processing apparatus 100 has been discussed. Each of the embodiments of the present invention is applicable to image display apparatuses displaying a three-dimensional image, such as a television receiver and a cellular phone. The embodiment of the present invention is also applicable to another electronic apparatus that can set the placement position of the icon of the geographical object on the map corresponding to the three-dimensional map data and stores the set icon placement position with the map associated therewith.

The embodiments of the present invention have been discussed for exemplary purposes only. Features of the embodiments of the present invention are related to specific elements of the present invention as described below. The present invention is not limited to the above described embodiments and various changes and modifications to the embodiments are possible without departing from the scope of the present invention.

The information processing apparatus corresponds to the information processing apparatus 100. The information processing system corresponds to the information processing system 800, and the map data storage unit corresponds to the map database 820.

The three-dimensional map data storage unit corresponds to the three-dimensional geographical data storage 120. The location information storage unit corresponds to the location information storage 130. The geographical object information storage unit corresponds to the geographical object information storage 140.

The placement position setting unit corresponds to the placement position setter 150.

The drawing unit corresponds to the drawing section 160.

The display unit corresponds to the display 170.

The step of retrieving the location information corresponds to step S902. The step of setting the display information placement position corresponds to step S906.

The process steps in the above-referenced embodiments may be considered as a method including a series of steps. The process steps may also be considered as a program for causing the computer to perform the series of steps or a recording medium storing the program.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
    a computer comprising:
        a drawing unit for receiving three-dimensional map data from a three-dimensional map data storage unit; and
        a placement position setting unit for
            receiving location information corresponding to points spaced at predetermined intervals on a map from a location information storage unit, the location information including types of geographical objects at the points;
            receiving geographical object information from a geographical object information storage unit, the geographical object information including a position of a geographical object on the map and display information relating to the geographical object; and
            setting a display-information-placement position for placing a sign on the map, wherein:
                the sign indicates the display information relating to the geographical object, and
                the display-information-placement position is set based on the location information at the points within a predetermined area surrounding the position of the geographical object,
    wherein the types of the geographical objects include a road type or a building type, and
    wherein the placement position setting unit sets the display-information-placement position by:
        setting the position of the geographical object as a base point;
        setting a point having the road type within a first predetermined area centered at the base point as a reference point:
        determining whether:
            all the points within a second predetermined area centered at the reference point have the road type, and
            no point on a line connecting the reference point and the base point corresponds to a building other than the geographical object; and
        setting, when a result of the determining step is positive, the reference point as the display-information-placement position.

2. The information processing apparatus according to claim 1,
    wherein the first predetermined area is a first round area having a first predetermined radius,
    wherein the reference point is located on a circumference of the first round area, and wherein the second predetermined area is a second round area having a second predetermined radius.

3. The information processing apparatus according to claim 1,
wherein the location information further includes altitude data at the points, and
wherein the placement position setting unit further sets an altitude of the sign based on the altitude data contained in the location information corresponding to the display-information-placement position.

4. The information processing apparatus according to claim 1, wherein the points form a grid on the map.

5. The information processing apparatus according to claim 1, wherein the drawing unit is further configured for drawing a three-dimensional image produced by projecting the three-dimensional map onto a plane and drawing the sign at the display-information-placement position.

6. The information processing apparatus according to claim 5, wherein the drawing unit further draws a predetermined line segment connecting the sign and an image in the three-dimensional image that corresponds to the geographical object.

7. The information processing apparatus according to claim 5, further comprising a display unit displaying the three-dimensional image.

8. The information processing apparatus according to claim 1, wherein the sign indicating the display information relating to the geographical object comprises at least one of a character, a symbol, a number and a graphic.

9. An image display apparatus, comprising:
a three-dimensional map data storage unit storing three-dimensional map data representing a three-dimensional map;
a location information storage unit storing location information at points spaced at predetermined intervals on the map, the location information including types of geographical objects at the points;
a geographical object information storage unit storing geographical object information, the geographical object information including a position of a geographical object on the map and display information relating to the geographic object;
a placement position setting unit setting a display-information-placement position for placing a sign on the map, wherein:
the sign indicates the display information relating to the geographical object, and
the display-information-placement position is set based on the location information at the points within a predetermined area surrounding the position of the geographical object;
a drawing unit drawing a three-dimensional image produced by projecting the three-dimensional map onto a plane and drawing the sign at the display-information-placement position; and
a display unit displaying the three-dimensional image,
wherein the types of the geographical objects include a road type or a building type, and
wherein the placement position setting unit sets the display-information-placement position by:
setting the position of the geographical object as a base point;
setting a point having the road type within a first predetermined area centered at the base point as a reference point;
determining whether:
all the points within a second predetermined area centered at the reference point have the road type, and
no point on a line connecting the reference point and the base point corresponds to a building other than the geographical object; and
setting, when a result of the determining step is positive, the reference point as the display-information-placement position.

10. An information processing system comprising:
a map data storage apparatus including:
a three-dimensional map data storage unit storing three-dimensional map data representing a three-dimensional map;
a location information storage unit storing location information at points spaced at predetermined intervals on the map, the location information including types of geographical objects at the points; and
a geographical object information storage unit storing geographical object information, the geographical object information including a position of a geographical object on the map and display information relating to the geographic object; and
an information processing apparatus mutually communicating with the storage apparatus via a predetermined communication line, the information processing apparatus including:
a placement position setting unit setting a display-information-placement position for placing a sign on the map, wherein:
the sign indicates the display information relating to the geographical object, and
the display-information-placement position is set based on the location information at the points within a predetermined area surrounding the position of the geographical object,
wherein the types of the geographical objects include a road type or a building type, and
wherein the placement position setting unit sets the display-information-placement position by:
setting the position of the geographical object as a base point;
setting a point having the road type within a first predetermined area centered at the base point as a reference point;
determining whether:
all the points within a second predetermined area centered at the reference point have the road type, and
no point on a line connecting the reference point and the base point corresponds to a building other than the geographical object; and
setting, when a result of the determining step is positive, the reference point as the display-information-placement position.

11. An information processing method comprising:
retrieving three-dimensional map data stored on a three-dimensional map data storage unit, location information stored on a location information storage unit, and geographical object information stored on a geographical object information storage unit, wherein:
the three-dimensional map data represents a three-dimensional map,
the location information is associated with points spaced at predetermined intervals on the map and includes types of geographical objects at the points, and the geographical object information includes a position of a geographical object on the map and display information relating to the geographic object; and setting, by a placement position setting unit, a display-information placement position for placing a sign on the map, wherein:
  the sign indicates the display information related to the geographical object, and
  the display-information-placement position is set based on the location information at the points within a predetermined area surrounding the position of the geographical object,
wherein the types of the geographical objects include a road type or a building type, and
wherein the placement position setting unit sets the display-information-placement position by:
  setting the position of the geographical object as a base point;
  setting a point having the road type within a first predetermined area centered at the base point as a reference point;
  determining whether:
    all the points within a second predetermined area centered at the reference point have the road type, and
    no point on a line connecting the reference point and the base point corresponds to a building other than the geographical object; and
  setting, when a result of the determining step is positive, the reference point as the display-information-placement position.

12. A non-transitory computer-readable storage medium storing a computer program, which, when executed, causes a computer to perform an information processing method comprising:
  retrieving three-dimensional map data stored on a three-dimensional map data storage unit, location information stored on a location information storage unit, and geographical object information stored on a geographical object information storage unit, wherein:
    the three-dimensional map data represents a three-dimensional map,
    the location information is associated with points spaced at predetermined intervals on the map and includes types of geographical objects at the points, and
    the geographical object information includes a position of a geographical object on the map and display information relating to the geographic object; and
  setting, by a placement position setting unit, a display-information placement position for placing a sign on the map, wherein:
    the sign indicates the display information related to the geographical object, and
    the display-information-placement position is set based on the location information at the points within a predetermined area surrounding the position of the geographical object,
  wherein the types of the geographical objects include a road type or a building type, and
  wherein the placement position setting unit sets the display-information-placement position by:
    setting the position of the geographical object as a base point;
    setting a point having the road type within a first predetermined area centered at the base point as a reference point;
    determining whether:
      all the points within a second predetermined area centered at the reference point have the road type, and
      no point on a line connecting the reference point and the base point corresponds to a building other than the geographical object; and
    setting, when a result of the determining step is positive, the reference point as the display-information-placement position.

* * * * *